(12) United States Patent
Jepsen et al.

(10) Patent No.: US 7,532,793 B2
(45) Date of Patent: May 12, 2009

(54) SEGMENTED WAVEGUIDE COUPLER

(75) Inventors: Anders Grunnet Jepsen, San Jose, CA (US); Craig Liddle, San Jose, CA (US); John Sweetser, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 377 days.

(21) Appl. No.: 10/629,262

(22) Filed: Jul. 29, 2003

(65) Prior Publication Data

US 2005/0025429 A1 Feb. 3, 2005

(51) Int. Cl.
*G02B 6/26* (2006.01)
(52) U.S. Cl. ............... 385/50; 385/30; 385/43
(58) Field of Classification Search ............ 385/30, 385/50, 129–131, 37, 43
See application file for complete search history.

(56) References Cited

U.S. PATENT DOCUMENTS

| 5,457,758 | A | * | 10/1995 | Snitzer | 385/30 |
| 5,577,141 | A | * | 11/1996 | Adar et al. | 385/43 |
| 5,610,760 | A | * | 3/1997 | Drenten et al. | 359/332 |
| 6,631,225 | B2 | * | 10/2003 | Lee et al. | 385/28 |

* cited by examiner

*Primary Examiner*—Jerry T Rahll
(74) *Attorney, Agent, or Firm*—Trop, Pruner & Hu, P.C.

(57) ABSTRACT

A planar light wave circuit may be formed with a pair of waveguides arranged in close proximity to one another. At least one of the waveguides may be segmented. Through segmentation, the average mode-field diameter may be adjusted. Controlling the average mode-field diameter enables precise control over the coupling characteristics.

15 Claims, 2 Drawing Sheets

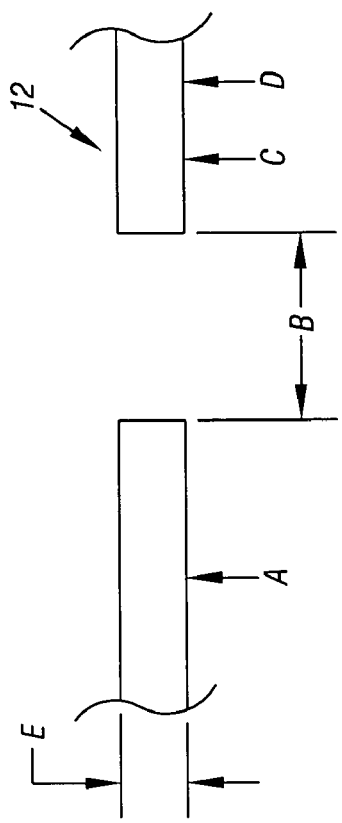
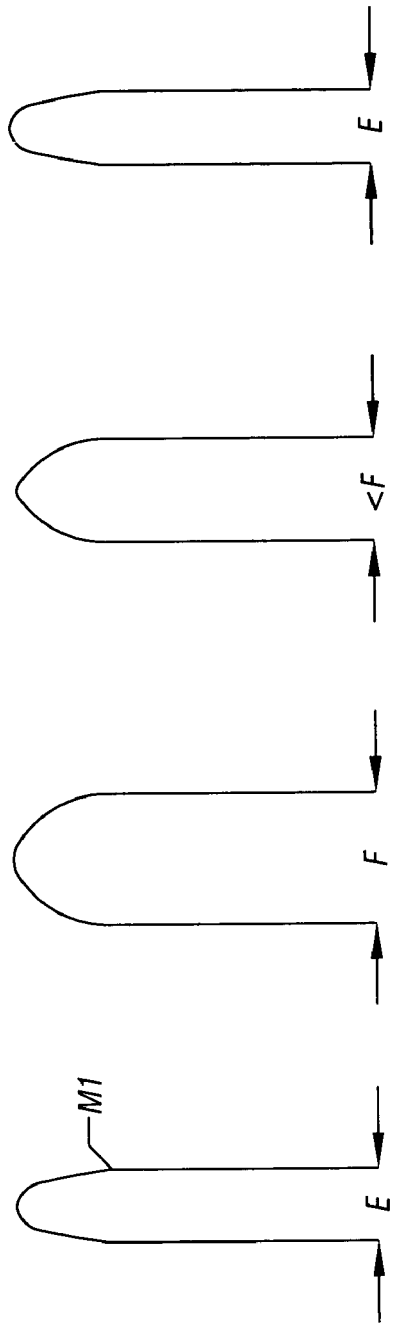

SEGMENTED WAVEGUIDE COUPLER

BACKGROUND

This invention relates generally to couplers for coupling optical signals.

Couplers couple a signal transmitted through a first waveguide into a second waveguide. Couplers may use fibers or planar waveguides.

In a planar waveguide, the optical paths are formed on a substrate using semiconductor processing techniques. A light path may travel through a so-called optical core formed over the substrate. The core may be covered with an appropriate cladding. The optical signal is transmitted through the core and, in some cases, may extend into the cladding. In fact, typically only about 70 percent of the light actually travels inside the core of a waveguide. The remaining 30 percent propagates in the cladding region outside the core.

With existing couplers, control over the degree of coupling is achieved by controlling the degree of spacing between the waveguides to be coupled. It would also be desirable to control one or more of the coupling ratio, wavelength dependence, and polarization dependence for applications ranging from simple optical filters to complex waveguides filters and polarization controlling elements.

BRIEF DESCRIPTION OF THE DRAWINGS

FIG. 2 is an enlarged, partial top plan view of a portion of one of the waveguides shown in FIG. 1 in accordance with one embodiment of the present invention;

FIG. 2A is a hypothetical Gaussian mode-field depiction of a signal at the point A in FIG. 2;

FIG. 2B is a hypothetical Gaussian mode-field depiction of a signal in the gap B in FIG. 2;

FIG. 2C is a hypothetical Gaussian mode-field depiction of a signal at the point C in FIG. 2; and FIG. 2D is a hypothetical Gaussian mode-field depiction of a signal at the point D in FIG. 2.

DETAILED DESCRIPTION

Figure 1:
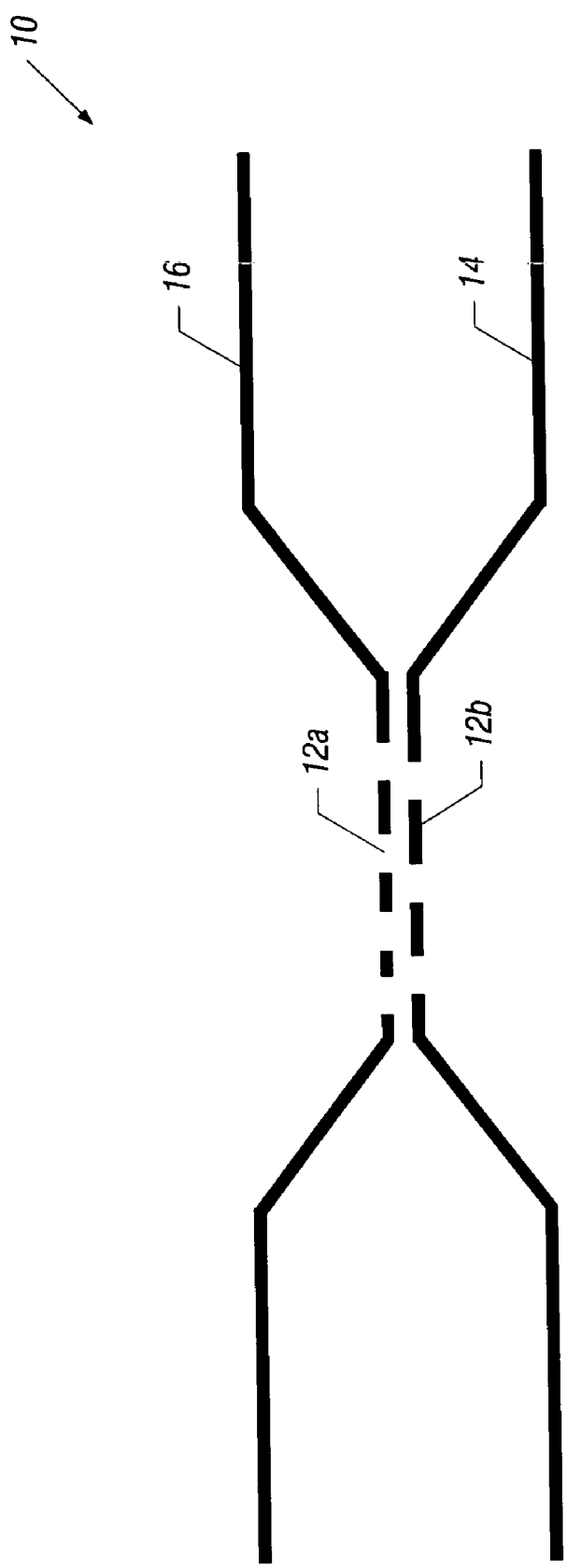
FIG. 1 is a top plan view a planar light wave circuit in accordance with one embodiment of the present invention.

Referring to FIG. 1, a planar light wave circuit 10 may be formed on a semiconductor substrate using semiconductor integrated circuit fabrication techniques. A pair of waveguide cores 14 and 16 may be defined on a planar light wave circuit 10. Waveguide cores 14 and 16 may be brought into relatively close proximity at the segmented regions 12a and 12b. Each core 14 and 16 may be defined by conventional semiconductor processing techniques such as deposition and etching. The formation of the segmented regions 12 and the gaps therebetween may be readily formed by patterning and etching techniques in one embodiment of the present invention.

In one embodiment of the present invention, the segmented regions 12a and 12b may be brought to close proximity to one another, for example in the range of 1 to 10 microns. The length of the segmented regions 12a and 12b, in one embodiment, may be on the order of a few hundred microns to allow light to couple from one waveguide 14 or 16 to the other waveguide 14 or 16.

The pattern of gaps in the segmented regions 12a and 12b may be engineered to control the mode size and mode overlap integral in the coupling region and ultimately to control the coupling energy. Thus, in some embodiments of the present invention, one or more of the coupling ratio, wavelength dependence, and polarization dependence may be controlled with a desirable degree of precision by engineering the arrangement of the gaps.

In some embodiments, the lengths of the gaps in the regions 12a and 12b may be different along the lengths of the regions 12a and 12b. In some embodiments, the spacing and size of the gaps may be regular and repetitive. In other embodiments, the arrangement of the gaps in the region 12a may be different than the arrangement of the gaps in the region 12b.

Referring to FIG. 2, a waveguide region 12, which may correspond to the region 12a or 12b in FIG. 1, may have a gap indicated at B. The size of the gap B may be controlled to achieve the desired coupling characteristics. The width of the waveguide is indicated as E in this embodiment. While a two-dimensional depiction is indicated by FIG. 2, those skilled in the art will appreciate that characteristics in the dimension into the page may also be relevant. However, for simplicity, a two-dimensional explanation follows for one embodiment of the present invention.

A light signal at the point A in the waveguide region 12 may have the Gaussian mode-field signal M1 indicated at FIG. 2A. The width of the signal may correspond to the width E of the waveguide as indicated in FIGS. 2 and 2A.

As the signal M1 propagates along from left to right, the light signal passes the point A, and eventually enters the gap B. As it extends into the gap or free space region, the light signal continues to expand indefinitely the Gaussian mode-field characteristics shown in FIG. 2B. In this case, the width F of the signal corresponds to a maximum width resulting from the characteristics of the signal and the size of the gap B.

Thereafter, as the signal continues to move from left to right, it encounters the reduced area of the end of the rightmost portion of the region 12 having a width E. The signal progressively reduces its Gaussian mode-field width to point C as shown in FIG. 2C, eventually reaching the point D and exhibiting the mode-field characteristics shown in FIG. 2D.

In FIG. 2D, the Gaussian mode-field is a Gaussian signal having a width E. At the point C, illustrated in FIG. 2C, the signal may have a mode-field having a width somewhere between that shown in FIG. 2B and that shown in FIG. 2D, but in any case less than the width shown in FIG. 2B and less than the maximum width achieved in the gap B.

Thus, as the light enters the waveguide region 12, it contracts to fill the certain space that depends on the geometry, the index of refraction and the wavelength. That signal maintains that shape on propagation through the waveguide. When the light leaves the waveguide, it starts expanding slowly and steadily. If the light hits another waveguide segment it starts contracting again until it reaches its natural beam width. Thus, for a series of segments, the light expands and contracts periodically, but ends up having an average width called the average mode-field diameter determined by the characteristics of the gaps between segments.

By adjusting the segmentation pattern of the waveguide regions 12a and 12b, the mode profile may be tailored for the coupled light propagated through the waveguides. The light may expand or contract its mode-field diameter as a function of position. This expanding and contracting of the mode-field diameter allows for the control of the coupling characteristics of the two waveguides 14 and 16 placed in close proximity to one another. The mode profile may be controlled by controlling the segmentation pattern.

The segmentation pattern is much less critically dependent on lithographic capabilities than, for example, the variable core width couplers. The mode confinement technique works in three dimensions and, therefore, suffers less from induced polarization dependencies than would arise with a two-dimensional approach, at least in some embodiments.

The coupling characteristics between the segments 12a and 12b are governed by the overlap integral of the modes in the two separate waveguides 14 and 16 that have been brought into close proximity. By controlling the mode-field size through segmentation of the waveguides, it is thereby possible to control the coupling ratio. The mode-field diameter can be controlled separately for the waveguides 14 and 16. The mode-field can also be varied along the length of a waveguide.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A planar light wave circuit comprising:
    a substrate;
    a pair of waveguides formed on said substrate; and
    a coupling region wherein said waveguides extend parallel to one another without touching but close enough to enable coupling between the waveguides, both of said waveguides being segmented in said coupling region, said waveguides including gaps along their lengths in the coupling region.

2. The circuit of claim 1 wherein one of said waveguides are segmented by having at least two gaps along the length of said waveguide in said coupling region.

3. The circuit of claim 2 wherein said gaps are regularly sized along the length of said coupling region.

4. The circuit of claim 2 wherein said gaps are irregularly sized along the length of said coupling region.

5. A method comprising:
    coupling a pair of light signals in a coupling region along two planar waveguides; and
    using gaps between segments along the length of said coupling region to control the coupling of signals between said waveguides.

6. The method of claim 5 including forming gaps of regular size along the length of said coupling region.

7. The method of claim 5 including forming a segmented coupling region between said two planar waveguides.

8. The method of claim 5 including segmenting both of said waveguides.

9. The method of claim 5 including forming gaps of irregular size along the length of the coupling region.

10. An optical circuit comprising:
    a substrate;
    a pair of planar waveguides formed on said substrate; and
    a coupling region where a portion of each waveguide extends parallel to the other portion and close enough for coupling to occur, said portions including gaps along their lengths in the coupling region.

11. The circuit of claim 10 wherein said gaps are arranged to improve the coupling between said waveguides.

12. The circuit of claim 10 wherein each of said waveguides includes at least two gaps.

13. The circuit of claim 10 wherein said circuit is a planar light wave circuit.

14. The circuit of claim 10 wherein said gaps are regularly sized along the length of each waveguide.

15. The circuit of claim 10 wherein said gaps are irregularly sized along the length of each waveguide.

* * * * *